(12) United States Patent
Kurihara et al.

(10) Patent No.: US 6,924,808 B2
(45) Date of Patent: Aug. 2, 2005

(54) AREA PATTERN PROCESSING OF PIXELS

(75) Inventors: Steven M. Kurihara, Palo Alto, CA (US); Charles F. Patton, Dublin, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 143 days.

(21) Appl. No.: 10/387,338

(22) Filed: Mar. 12, 2003

(65) Prior Publication Data

US 2003/0184551 A1 Oct. 2, 2003

Related U.S. Application Data

(60) Provisional application No. 60/363,654, filed on Mar. 12, 2002.

(51) Int. Cl.[7] .................................................. G06T 1/20
(52) U.S. Cl. ....................... 345/506; 345/503; 345/531; 345/533; 345/564; 345/613; 345/614
(58) Field of Search ................................. 345/503, 506, 345/531, 533, 564, 613, 614, 501, 504

(56) References Cited

U.S. PATENT DOCUMENTS 5,943,060 A * 8/1999 Cosman et al. ............. 345/613
6,159,152 A * 12/2000 Sumanaweera et al. ..... 600/443

* cited by examiner

Primary Examiner—Ulka J. Chauhan
(74) Attorney, Agent, or Firm—Meyertons Hood Kivlin Kowert & Goetzel, P.C.; Jeffrey C. Hood; Mark K. Brightwell

(57) ABSTRACT

A circuit for outputting area pattern bits from an area pattern array. The circuit includes a first stage, second stage and third stage. The first stage is configured to output N adjacent scan lines from a 2N×2N area pattern array based on a first address. N is a positive integer. The second stage is configured to receive the N adjacent scanlines and to select an N×N block from the N adjacent scanlines based on a second address. The third stage is configured to (a) select an (N/2)×N region of bits from the N×N block and load bits of the (N/2)×N region into a set of pixel tag outputs in a first mode, and (b) select an N×(N/2) region of bits from the N×N block and load bits of the N×(N/2) region into the set of pixel tag outputs in a second mode.

26 Claims, 15 Drawing Sheets

| cs | ap | tb | Area Pattern Bit | RGB Pixel Data Source |
|---|---|---|---|---|
| CONSTANT | DISABLE | n/a | n/a | RGB from Foreground Color |
| CONSTANT | ENABLE | DISABLE | One | RGB from Foreground Color |
| CONSTANT | ENABLE | DISABLE | Zero | RGB from Background Color |
| CONSTANT | ENABLE | ENABLE | One | RGB from Foreground Color |
| CONSTANT | ENABLE | ENABLE | Zero | Don't write pixel (transparent) |
| VARIABLE | DISABLE | n/a | n/a | RGB from TE interface |
| VARIABLE | ENABLE | DISABLE | One | RGB from TE interface |
| VARIABLE | ENABLE | DISABLE | Zero | RGB from Background Color |
| VARIABLE | ENABLE | ENABLE | One | RGB from TE interface |
| VARIABLE | ENABLE | ENABLE | Zero | Don't write pixel (transparent) |

FIG. 14

| xs | ap | tb | Area Pattern Bit | X Pixel Data Source |
|---|---|---|---|---|
| WID | DISABLE | n/a | n/a | X from Current WID |
| WID | ENABLE | DISABLE | n/a | X from Current WID |
| WID | ENABLE | ENABLE | One | X from Current WID |
| WID | ENABLE | ENABLE | Zero | Don't write pixel (transparent) |
| CONSTANT | DISABLE | n/a | n/a | RGB from Foreground Color |
| CONSTANT | ENABLE | DISABLE | One | RGB from Foreground Color |
| CONSTANT | ENABLE | DISABLE | Zero | RGB from Background Color |
| CONSTANT | ENABLE | ENABLE | One | RGB from Foreground Color |
| CONSTANT | ENABLE | ENABLE | Zero | Don't write pixel (transparent) |
| VARIABLE | DISABLE | n/a | n/a | RGB from TE interface |
| VARIABLE | ENABLE | DISABLE | One | RGB from TE interface |
| VARIABLE | ENABLE | DISABLE | Zero | RGB from Background Color |
| VARIABLE | ENABLE | ENABLE | One | RGB from TE interface |
| VARIABLE | ENABLE | ENABLE | Zero | Don't write pixel (transparent) |

FIG. 15

AREA PATTERN PROCESSING OF PIXELS

PRIORITY CLAIM

This application claims priority to U.S. Provisional Application No. 60/363,654 filed on Mar. 12, 2002 entitled "Area Pattern Processing of Pixels in Super Sample Mode" invented by Steve M. Kurihara and Charles F. Patton. This Provisional Application is hereby incorporated by reference in its entirety as though fully and completely set forth herein.

BACKGROUND OF THE INVENTION

1. Field of the Invention

This invention relates generally to the field of computer graphics and, more particularly, to a pipelined system and method for generating an area pattern for controlling various pixel operations within a graphics accelerator system.

2. Description of the Related Art

Early graphics systems were limited to two-dimensional (2D) graphics, were configured to compute a gray scale value for each pixel displayed, and acted as simple translators or interfaces to a display device. Modern high performance graphics systems, however, may support three-dimensional (3D) graphics with one or more special effects such as anti-aliasing, texturing, shading, fogging, alpha-blending, and specular highlighting. 3D graphics data may be several orders of magnitude larger than comparable 2D graphics data. 3D graphics data may include a set of information components for each vertex of the geometric primitives used to model the objects to be imaged.

In recent years, demand for high performance graphics systems that can render complex three-dimensional (3D) objects and scenes have increased substantially. This increase is at least in part due to the demand for new applications such as computer-generated animation for motion pictures, virtual reality simulators/trainers, and interactive computer games. These new applications place tremendous computational loads upon graphics systems. Modern computer displays have also improved and have a significantly higher pixel resolution, greater color depth, and are able to display more complex images with higher refresh rates than earlier models. Consequently, modern high performance graphics systems incorporate graphics processors with a great deal of complexity and power, and the color value of one pixel may be the accumulated result of many calculations involving several models and mathematical approximations.

With each new generation of graphics system, there is more image data to process, the processing is more complex, and there is less time in which to process it. Thus, there exists a continual need for more efficient graphical processing resources. In particular, there exists a significant need for circuits and processes capable of efficiently generating area patterns for pixels and/or supersamples.

A graphics system may generate blocks of data (such as pixels) and apply bits of an area pattern (stored in a memory) to the blocks. Area patterning in graphics systems has typically been implemented in a fashion that constrains block origin addresses to be aligned within the area pattern array. This is unfortunate because in certain circumstances it may be advantageous for rendering hardware and/or software to generate data blocks (e.g., blocks of pixels or supersamples) with addresses that are not necessarily aligned with respect to the area pattern array (or regularly demarked boundaries within the area pattern array). Thus, there exists a need for a circuit and corresponding methodology capable of mapping bits of an area pattern onto blocks having arbitrary origins with respect to the array pattern array.

SUMMARY OF THE INVENTION

In one set of embodiments, a circuit for outputting area pattern bits from an area pattern array. The circuit includes a first stage, second stage and third stage. The first stage is configured to output N adjacent scan lines from a 2N×2N area pattern array based on a first address. N is a positive integer. The second stage is configured to receive the N adjacent scanlines and to select an N×N block from the N adjacent scanlines based on a second address. The third stage is configured to (a) select an (N/2)×N region of bits from the N×N block and load bits of the (N/2)×N region into a set of pixel tag outputs in a first mode, and (b) select an N×(N/2) region of bits from the N×N block and load bits of the N×(N/2) region into the set of pixel tag outputs in a second mode. The first mode may be a standard (pixel) mode and the second mode may be a supersample mode.

This area patterning circuit may advantageously allow the patterning of blocks having arbitrary origins with respect to the array pattern array.

The parameter N may be a power of two. For example, in one embodiment, N=16. However, the inventive principles described herein naturally generalize to the arbitrary positive integer N.

The N adjacent scan lines are consecutive scan lines in the circular topology (i.e., modulo 2N topology) of the area pattern array.

In some embodiments, the first stage includes a first rank of M register files and a second rank of M register files, where M is a positive integer. Each register file of the first rank may store 2N/M scan lines of the area pattern array. Furthermore, each register file of the second rank may store N/M scan lines of the area pattern array. The first rank may be configured to output a first set of (N/2) of the N adjacent scanlines, and the second rank may be configured to output a second set of (N/2) of the N adjacent scanlines. The register files are programmable by a host processor.

The second stage may include an array of N mux logic units. Each mux logic unit may be configured to receive a corresponding one of the N adjacent scanlines and to select a set of N consecutive bits defined by the second address input from the corresponding scanline.

The second stage may include a first level of muxes and a second level of muxes coupled to the outputs of the first level of muxes. The first level of muxes may be controlled by y (i.e., vertical) address information. The second level of muxes may be controlled by a stereo indicator bit that selects between stereo mode and non-stereo mode.

The third stage may be further configured to select a $K_1 \times K_2$ rectangle of bits from the N×N block in response to an opcode input indicating a pixel write fragment mode. The third stage may be configured to generate a set of $K_1 * K_2$ inhibit signal outputs based on the values of the $K_1 \times K_2$ rectangle of bits. The inhibit signal outputs conditionally inhibit pixel write operations for a corresponding rectangular tile of pixels. In one embodiment, $K_1 = K_2 = 2$. Furthermore, the third stage may generate a set of source select signal outputs based on values of the $K_1 \times K_2$ rectangle of bits and control input signals. The source select control signals may determine data sources color information (e.g., RGB values) and a data source alpha information.

In another set of embodiments, a method for outputting bits from an area pattern array may be arranged as follows. The method may include:

(a) outputting N adjacent scan lines of a 2N×2N area pattern array based on a first address input, wherein N is a positive integer;

(b) selecting an N×N block from the N adjacent scanlines based on a second address input; and (c) selecting an (N/2)×N region of bits from the N×N block and load bits of the (N/2)×N region into a set of pixel tag outputs in a first mode, and selecting an N×(N/2) region of bits from the N×N block and load bits of the N×(N/2) region into the set of pixel tag outputs in a second mode.

The operations (a), (b) and (c) may be performed in a pipelined fashion.

In yet another set of embodiments, a graphics system may be configured to include a frame buffer and a hardware accelerator. The hardware accelerator may be operable to receive graphics data, to render samples in response to the graphics data, to store the samples in the frame buffer, to read and filter the samples from the frame buffer to generate pixels, and to store the pixels in the frame buffer. The hardware accelerator may include a circuit for outputting pattern bits of an area pattern in one or more formats depending on a mode of operation. The pattern bits may control pixel operations such as pixel write operations, data source selection operations, or block write operations (e.g., fast fill or fast fill partial operations).

BRIEF DESCRIPTION OF THE DRAWINGS

The foregoing, as well as other objects, features, and advantages of this invention may be more completely understood by reference to the following detailed description when read together with the accompanying drawings in which:

FIG. 14 is a table defining a color source selection function according to one embodiment; and FIG. 15 is a table defining an alpha (x) pixel source selection function according to one embodiment.

Figure 1:
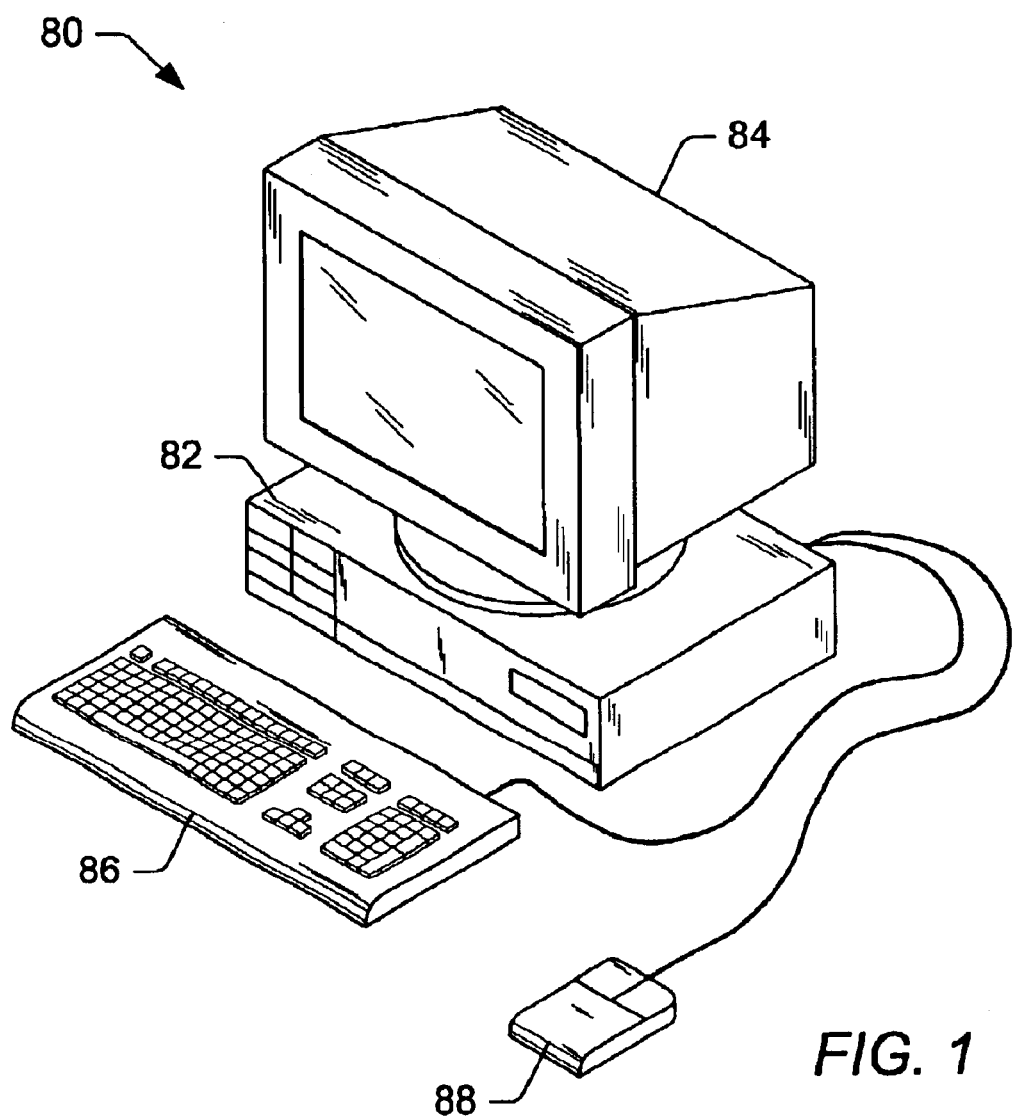
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
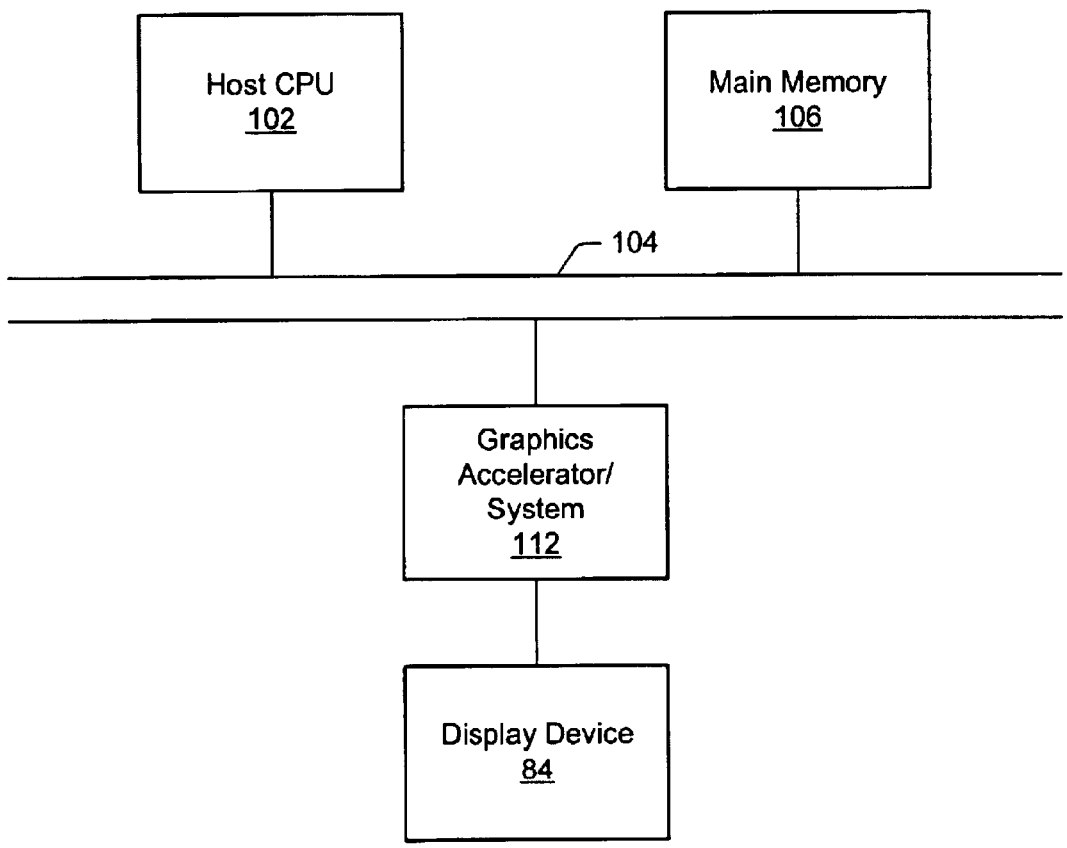
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
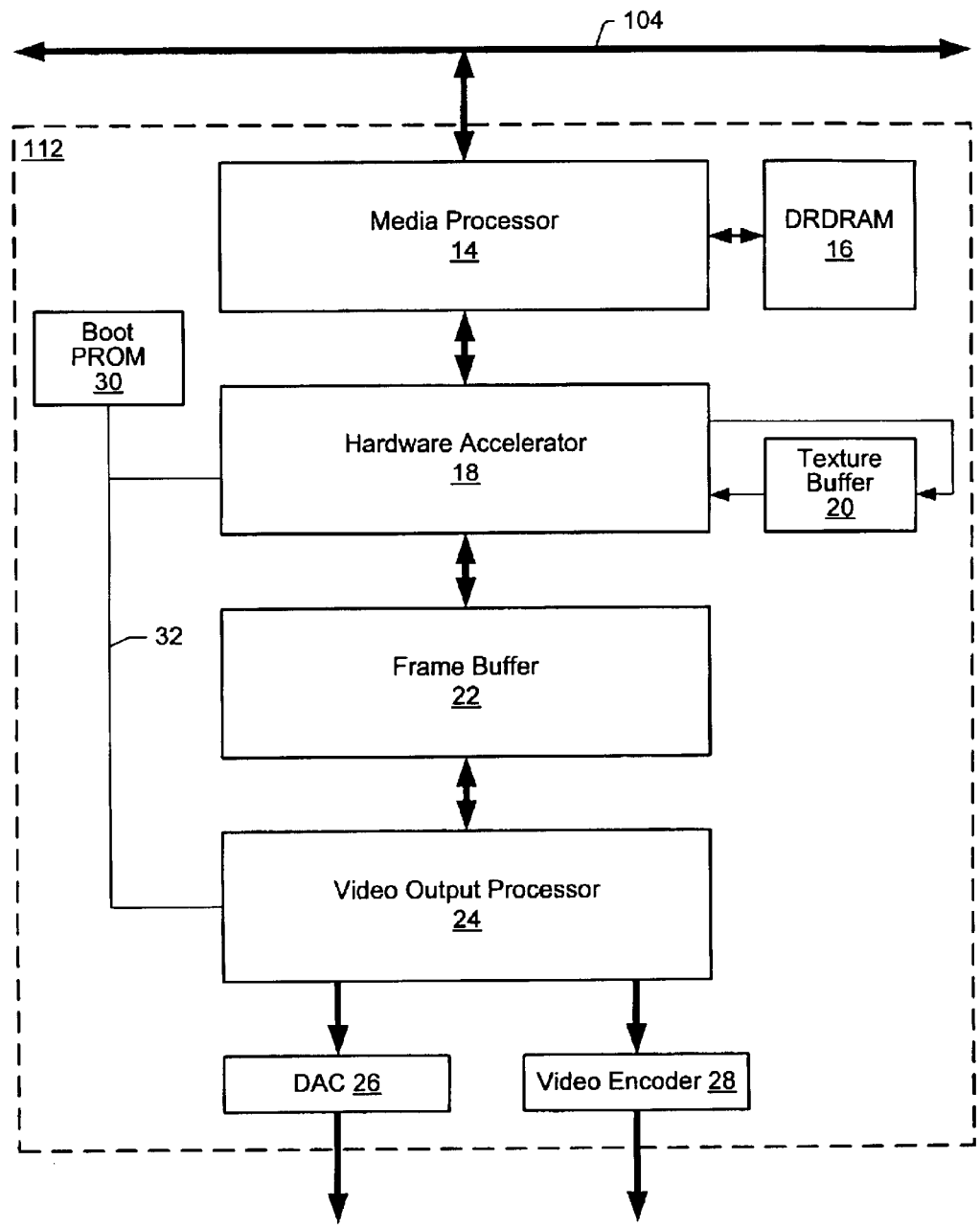
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
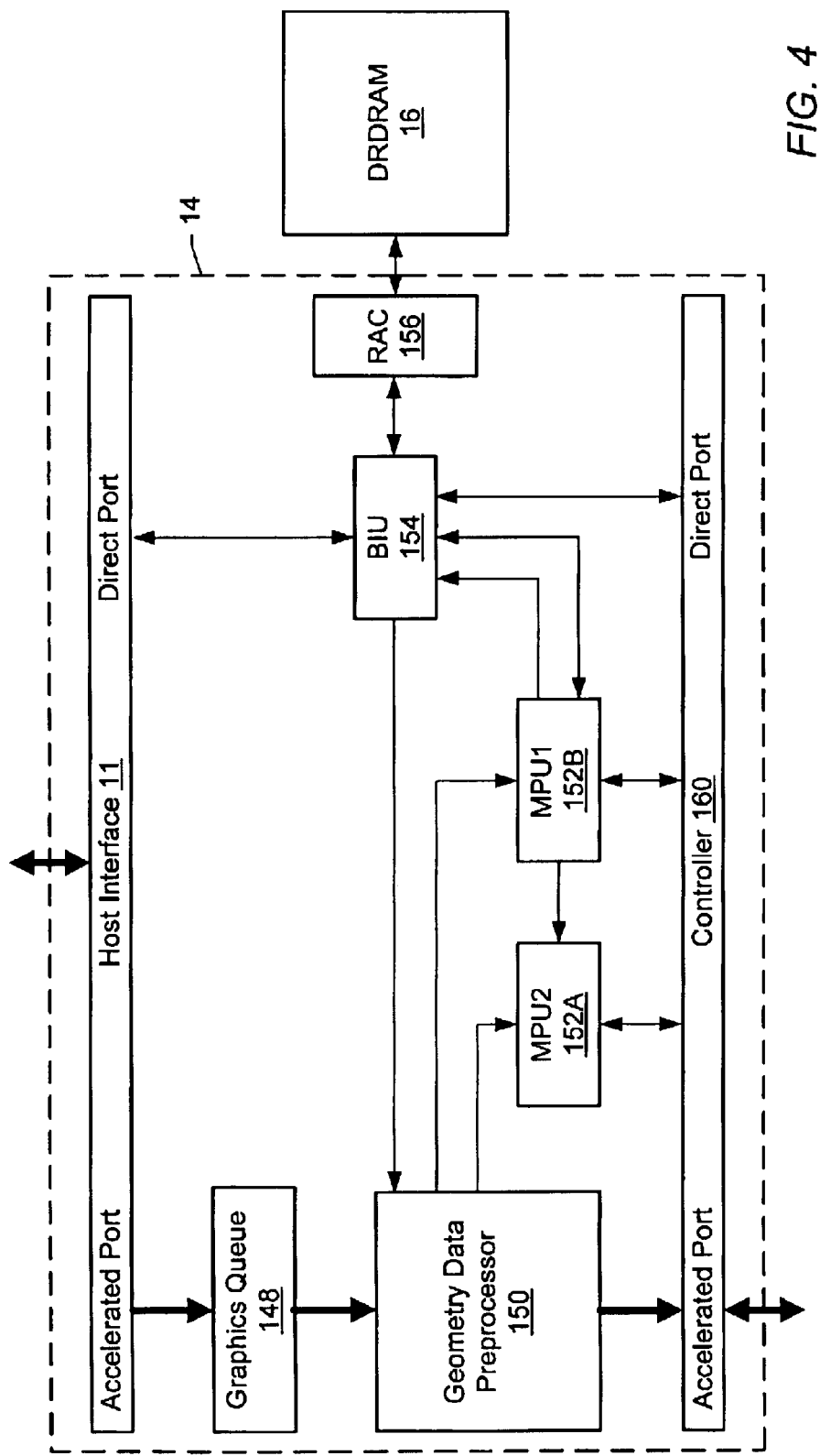
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappinga (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
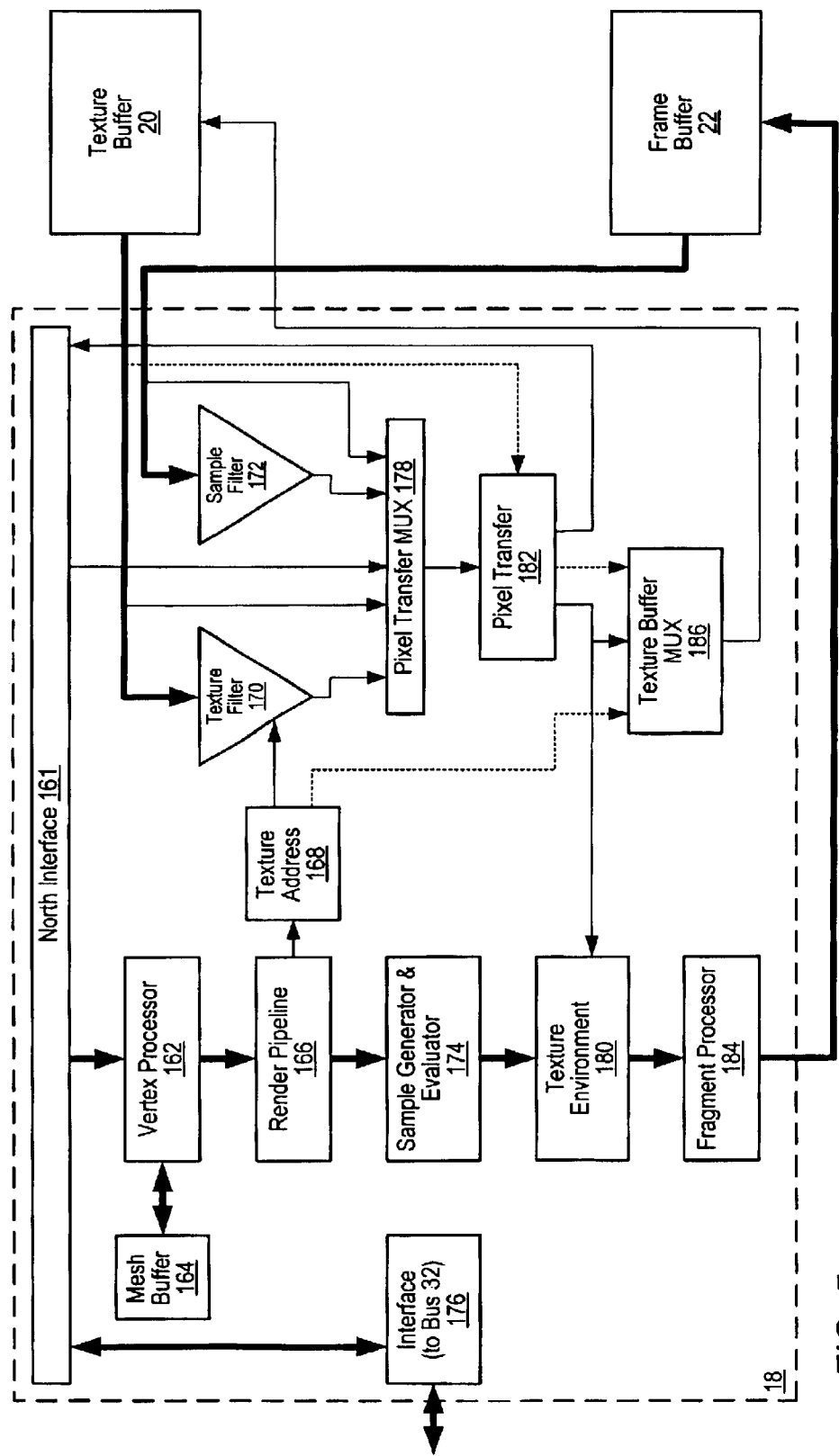
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3D-RAM memory devices (e.g. 3D-RAM64 memory devices) manufactured by Mitsubishi Electric Corporation. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and sample buffer.

Figure 6:
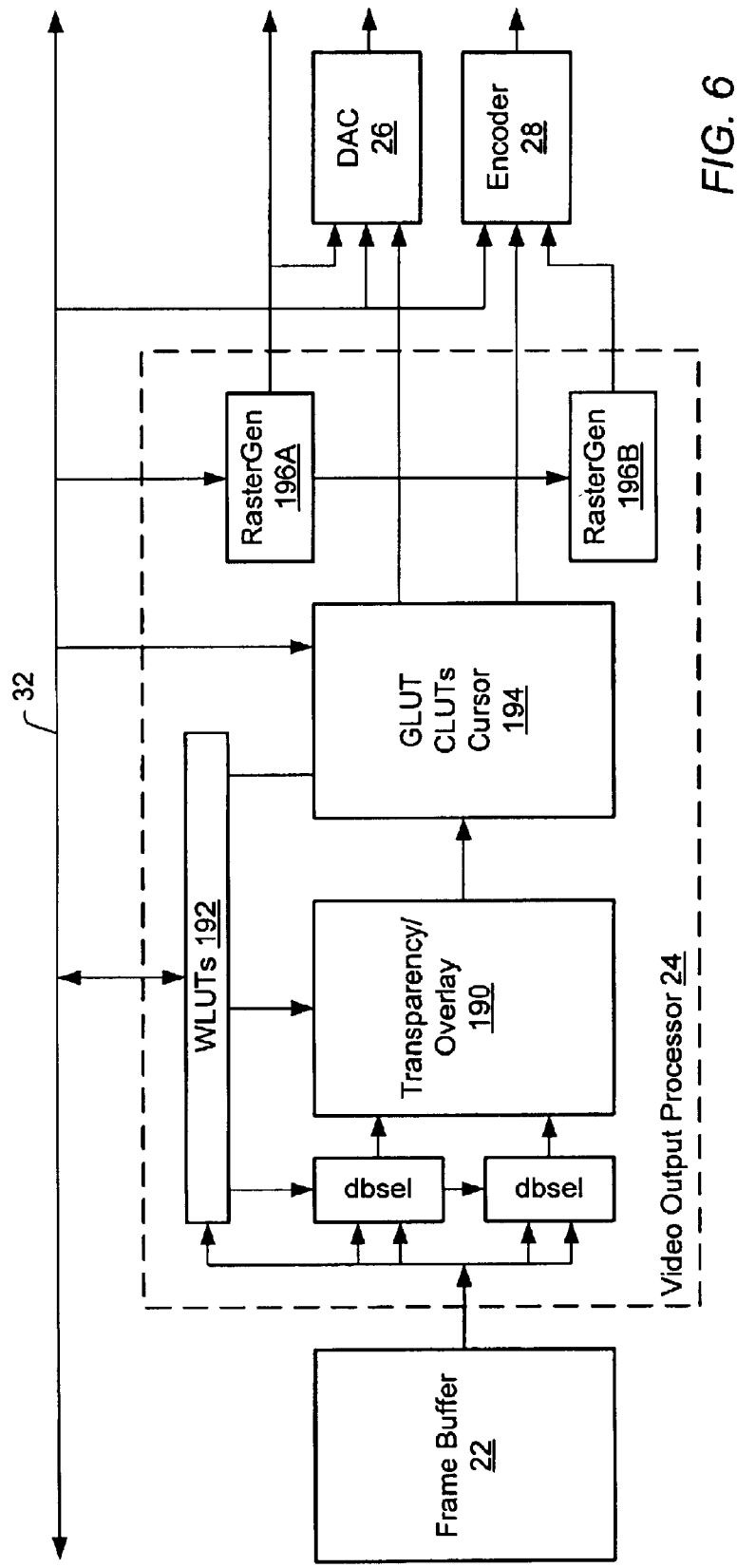
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
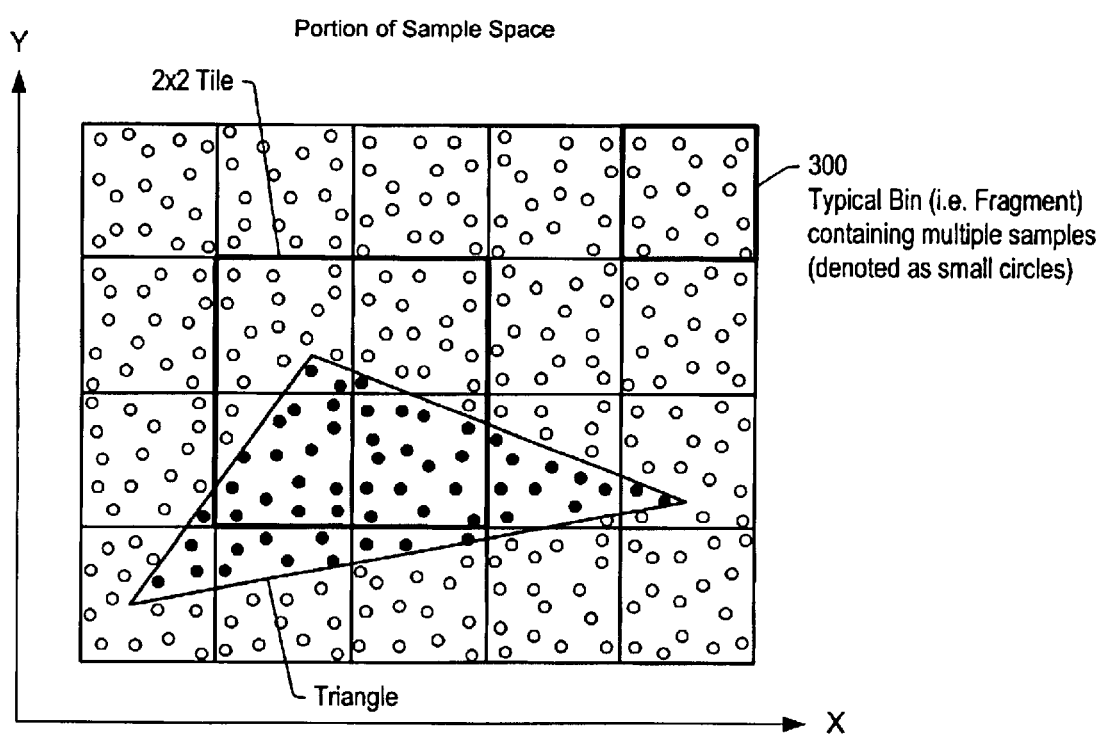
FIG. 7 illustrates an array of bins in a rendering space, and a superimposed triangle.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g. bin 300) as illustrated in FIG. 7. Each bin may contain one or more samples. The number of samples per bin may be a programmable parameter.

Please refer to U.S. patent application Ser. No. 10/383, 234, filed on Mar. 6, 2003, entitled "Dynamically Adjusting A Number of Rendering Passes in a Graphics System", invented by Michael G. Lavelle, for additional description of various embodiments of graphics system 112, hardware accelerator 18 and frame buffer 22. This patent application is hereby incorporated by reference in its entirety.

Fragment Processor

The hardware accelerator 18 includes a fragment processor (FP) 184 as shown in FIG. 5. The FP receives data, address and control signals from the texture environment (TE) 180 and outputs this data to the frame buffer address translation module (FBA). Various single pixel/sample processes may be performed in the FP. The FP may operate on 2×2 non-textured or textured fragment tiles. The FP may perform pixel merging in non-supersampled mode.

The FP may determine whether or not a pixel/sample is to be drawn into the frame buffer 22, substitute colors in some cases, modify the color in other cases, and specify how the pixel/sample color is to be combined with the existing pixel/sample color in the frame buffer. The FP is situated between the texture environment unit (TE) and the FBA in the pixel pipeline and performs various functions including: viewport clipping (2D,3D); auxiliary clipping; alpha clipping; alpha test; color test; depth cueing (fog); area patterning; and fragment merging.

Figure 8:
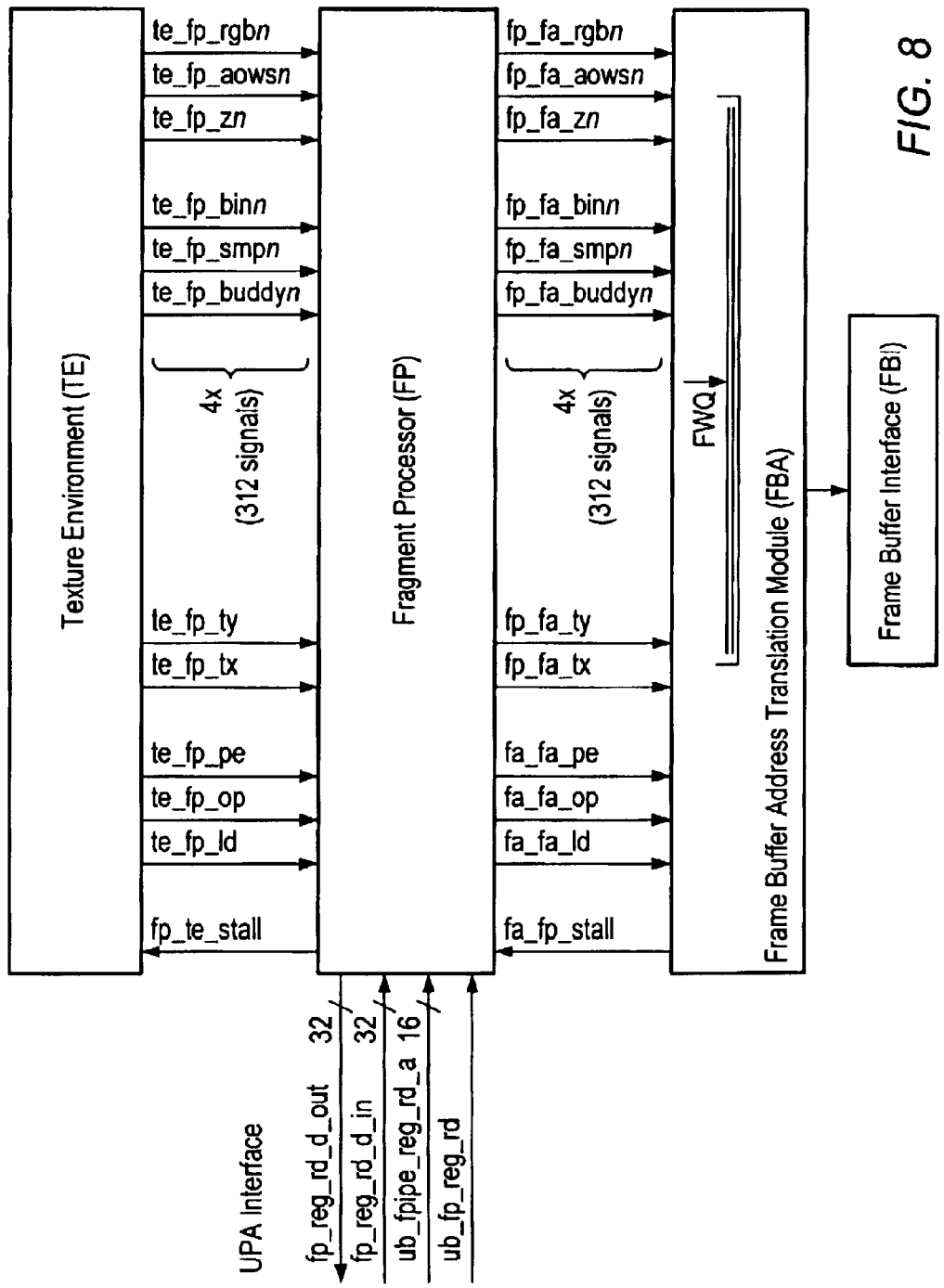
FIG. 8 illustrates one embodiment of the interface between the fragment processor (FP), texture environment (TE) and frame buffer address translation unit (FBA)

In one set of embodiments, the FP has three external interfaces: the TE interface, the FBA interface, and a read port interface (e.g., an UPA read port interface). (UPA is acronym for Universal Port Architecture.) FIG. 8 illustrates one embodiment of these three interfaces within the hardware accelerator 18.

Figure 9:
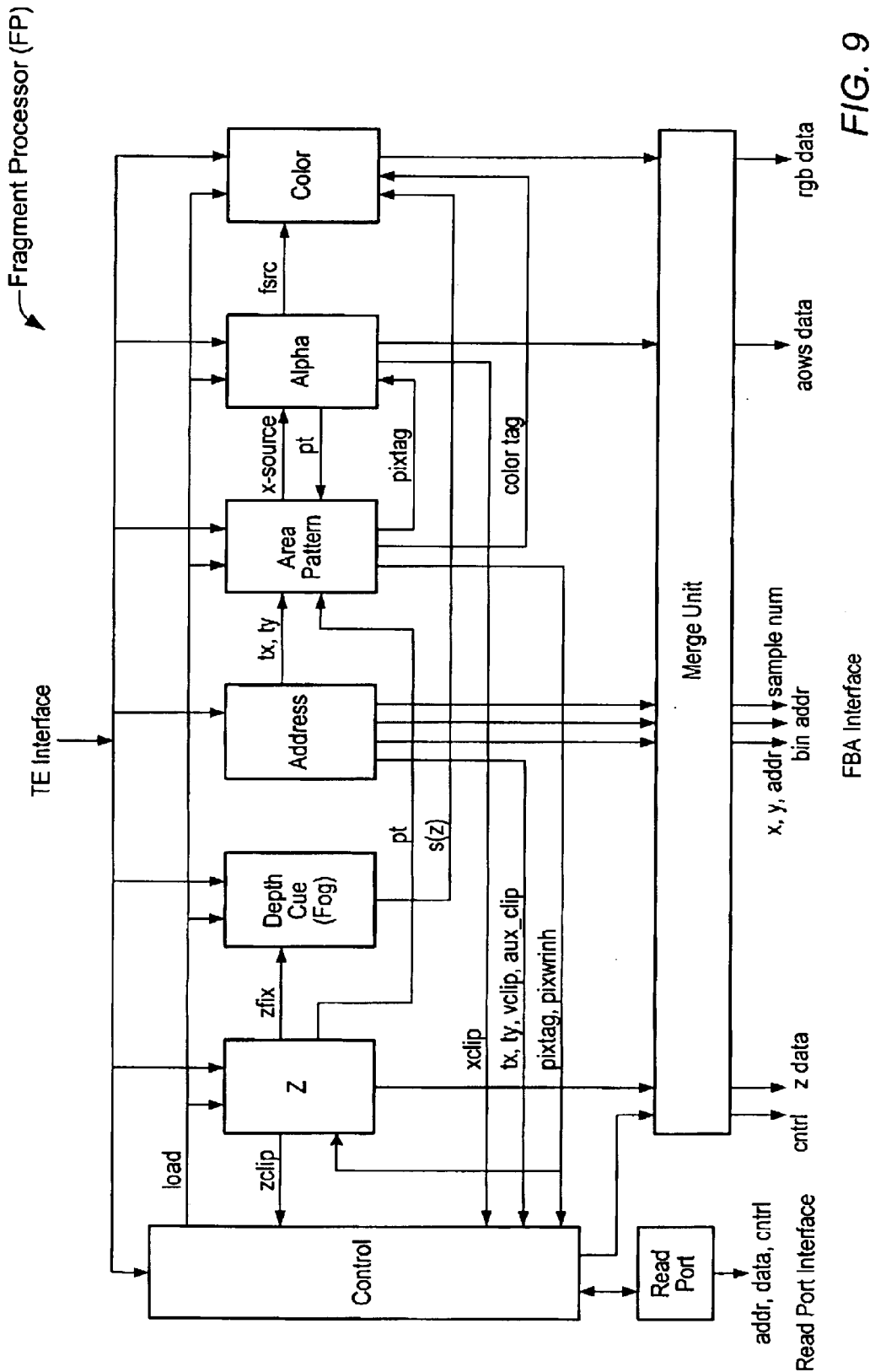
FIG. 9 is a top-level block diagram of the fragment processor (FP)

The FP may include a control pipeline along with several datapath pipelines which process the pixel/sample information before sending it out to the FBA interface. FIG. 9 illustrates one embodiment of the FP.

The Z submodule (also referred to as the Z pipeline) selects a source for Z data. The source data comes from either the TE interface, or constant source registers in the FP. The Z submodule contains Z clipping logic. The result generated by the Z clipping logic may be sent to the control pipeline where other clipping tests may be performed.

During a "fast fill partial" operation, the render pipe 166 may generate blocks of pixel tags and forward these pixel tags to the FP. In one embodiment, a block includes 128 pixels tags. The pixel tags are received by the alpha pipeline and z pipeline, and forwarded to the area pattern pipeline. These pixel tags are then processed with the block pattern bits in the area pattern pipeline before being sent back through the alpha pipeline and z pipeline for subsequent output to the merge unit.

The depth cue submodule may implement a fog feature. This depth cue function may scale the intensity of the color channels for each 2×2 tile of pixels/samples output as a function of depth (Z). In one embodiment, a total of eight slope regions may be used to determine the fog scale factor as a function of Z.

The address pipeline may receive the screen space X/Y tile address, bin address, and sample number from the TE interface, and send this address information to the merge unit. The merge unit may forward this address information to the FBA interface. In addition, the 2D viewport clip tests may be performed with respect to the auxiliary clip regions and the normal viewport clip region. The clipping results may be output to the control pipeline where they are combined with other clipping tests.

The area pattern submodule (also referred to as the area pattern pipeline) generates source select control signals for the alpha and color pipelines. These control signals are used to select the proper alpha and color channel sources.

The area pattern submodule may also receive the incoming pixel tag values sent on the AOWS and Z-channel during fastfill-partial operations, and process these pixel tags based on the block pattern bits in the area pattern array. The pixel tags are then sent back to the alpha pipeline and z pipeline where they are output to the merge unit. A set of pixel write inhibit signals used by the control submodule are also generated in the area pattern submodule. The area pattern submodule may contain a 32×32 memory array which is used to store the 32×32 area pattern. (AOWS is an acronym for alpha, overlay, window ID and stencil.)

The alpha submodule may select the source of the alpha data. For the alpha source, this data may be one of alpha, overlay, window ID, or stencil. In the case of alpha, the data may come from either the variable data from the TE interface, or constant data from either the foreground X data or the background X data. For overlay, the data may come from either the variable data from the TE interface, or constant data from either the foreground overlay data or the background overlay data. For window ID, the data may come from either the variable data from the TE interface, or from the constant WID register. And similarly for stencil, the data may come from either the TE interface or the constant stencil register. The X-threshold clip test is performed on the alpha channel.

During fastfill-partial operations, the pixel tags with the area pattern mask from the area pattern pipeline are sent to the alpha pipeline, where they are muxed with the actual AOWS data before being sent down to the merge unit.

The color submodule selects the proper color channel source. For the RGB color source, the data may come from either the constant background register, or the RGB data from the TE interface. The RGB data from the TE interface may be either variable data or constant data from the foreground register in the TE module.

Once the color channel source is determined, the color submodule combines this source data with the fog scale factor from the depth cue submodule. Fog equations are then used to calculate new RGB pixel data for each pixel/sample of the 2×2 tile. (Note that alpha blending may be performed in the memory devices of the frame buffer.) The color test may be performed on the new fog color for all three color channels and all four interleaves. (Note that the inventive principles described herein naturally generalize to any number of interleaves.)

The control pipeline may contain a set of control registers. The attributes specified by these registers may be used with the address, data, and control signals from the TE interface to generate the various control signals used within the FP datapaths. In addition, the control signals used by the FBA may be generated in this submodule.

The read port submodule may provide the read-back mechanism to read the registers in the FP. For register reads, the UPA module may send an address and a request signal to the FP. The FP may then send the read data back to the UPA module.

The merge unit may perform pixel merging. In one embodiment, the merge unit may perform two types of pixel merging in non-supersample mode. The merge unit may merge two tiles, each with pixel 0 enabled, into a single tile with two pixels enabled. Or it may merge two tiles, each with pixel 0 and pixel 1 enabled into a single tile with all four pixels enabled prior to sending it to the frame buffer write queue (FWQ) in the FBA. Pixel merging improves pixel write performance when crossing clock domains from GCLK to FCLK.

Fragment Processor Functionality

For the viewport clipping function, the FP may receive the incoming x,y tile address and bin address and compare it to the xmin, xmax, ymin, ymax values set in the viewport clip boundary registers. For 3D operations, the Z-value may also be compared against the zmin, zmax values. The pixel/sample may be clipped (i.e., not written to the frame buffer 22) if it lies outside the region specified by the register values.

For the auxiliary clipping function, the FP may receive the incoming x,y tile address and bin address and compares it to the xmin, xmax, ymin, ymax values set in the eight auxiliary clip boundary registers. The pixel/sample may be clipped (i.e., not written to the frame buffer) if it lies outside the region specified by the register values.

Alpha Test. After the alpha source is determined, this alpha value may be compared against a reference value specified by the X-Data threshold register and the X-Test pass condition register. If the alpha test fails, the pixel/sample may be clipped.

Color Test. After the color source is determined and the fog color is calculated, this RGB value may be compared against a reference value specified by the color threshold register and the color test pass condition register. If the color test fails for any one of the three color components, the pixel/sample may be clipped.

Depth Cueing (Fog). A fog scale factor may be determined after converting the incoming floating point Z value to a fixed point Z value. The fog scale factor may be based on the fixed point Z value and an eight slope region fog function. The calculated fog scale factor may then be used in calculating the new fogged color. If fog is disabled, a fog scale factor of 1.0 may be used.

Area Patterning. A 32×32 area pattern may be stored in register files within the FP. During a fastfill-partial operation or a fastfill-full operation, if area pattern is enabled, each pixel tag from the render pipe may be masked with the corresponding area pattern bit. In addition, if the FP receives a fastfill-full transaction and area pattern is enabled, the FP may convert this opcode to fastfill-partial before sending it to the FBA. During "write fragment tile" operations (wr_frag_tile), if area pattern is enabled, the area pattern bit may be used in conjunction with transparent background to determine if the pixel is to be written. Note that the inventive principles described herein naturally generalize area patterns of arbitrary size.

Figure 10A:
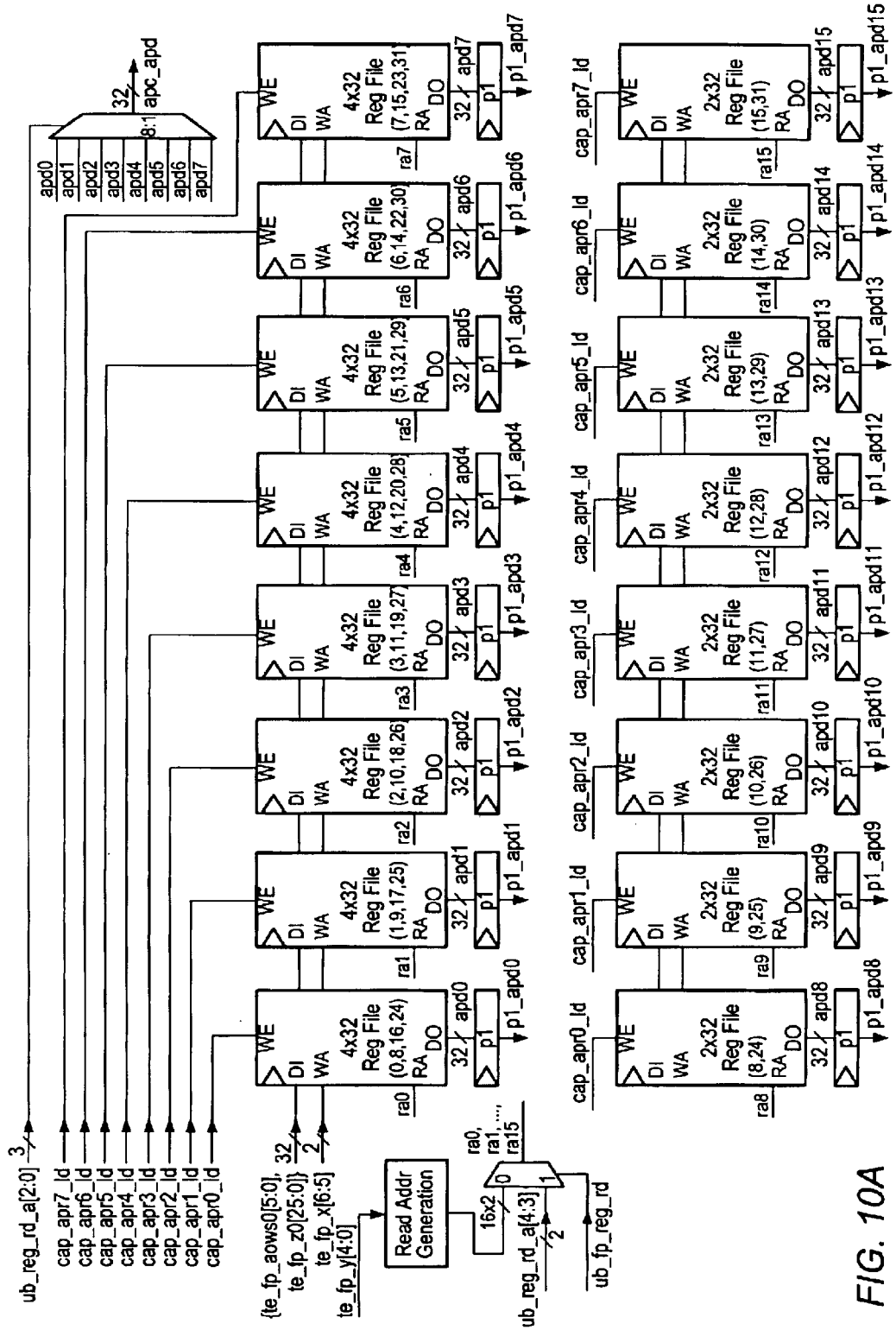
FIG. 10A illustrates one embodiment for a first stage of the area pattern pipeline.
Figure 10B:
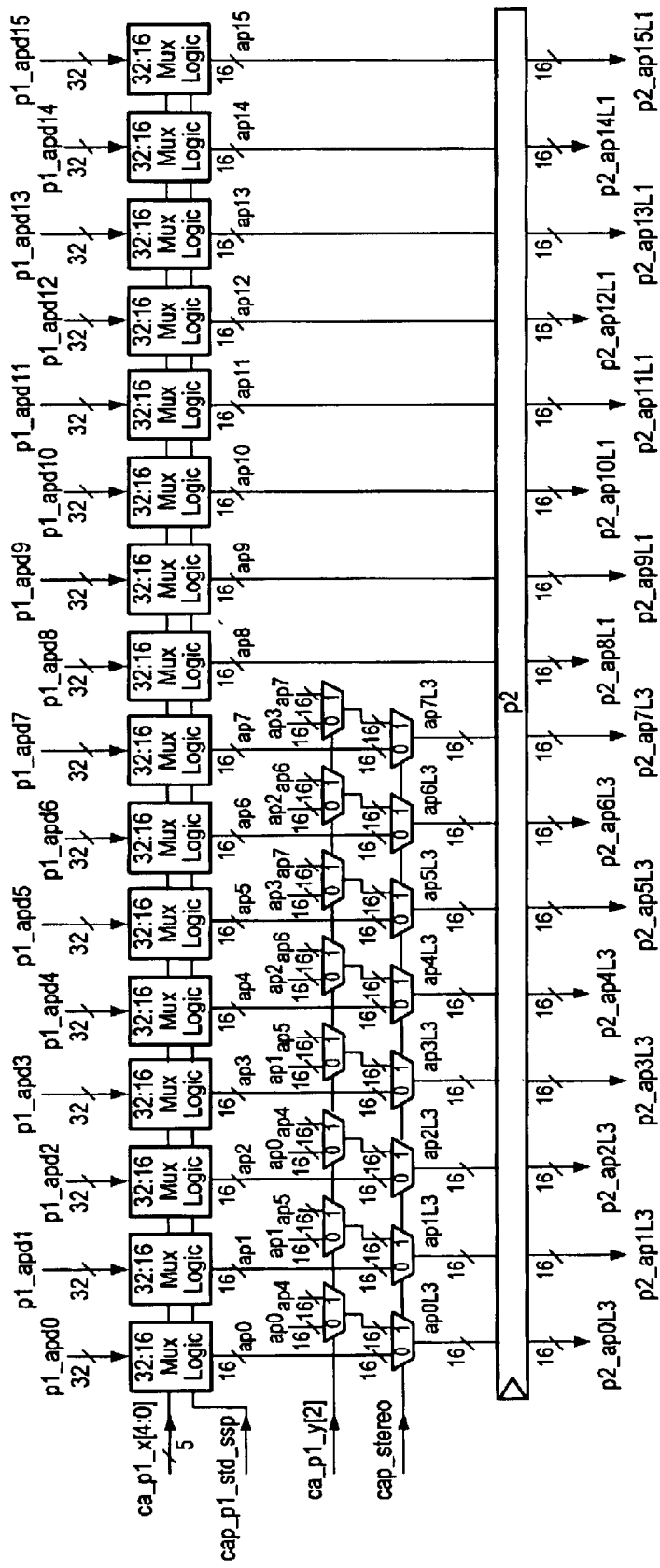
FIG. 10B illustrates one embodiment for a second stage of the area pattern pipeline.
Figure 10C:
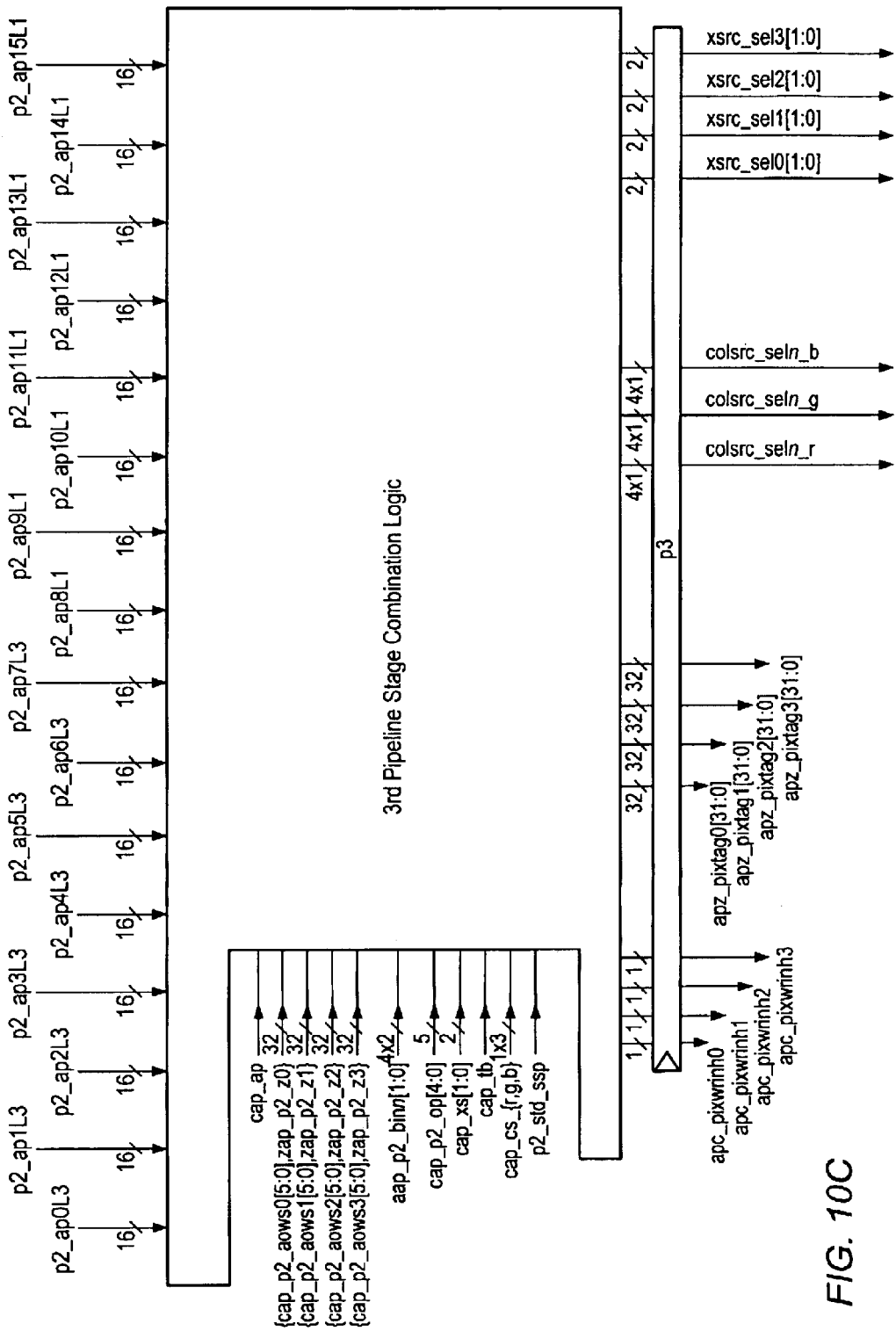
FIG. 10C illustrates one embodiment for a third stage of the area pattern pipeline.

The type of operation to be performed may be determined by an opcode supplied by the TE interface. In FIG. 10C the opcode input is a 5-bit input and is referred to as te_fp_op.

Fragment Merging. Pixels from separate tiles may be merged into a single time if the separate tiles meet certain criteria. In one embodiment, pixels may be merged from two separate tiles as follows. Two back-to-back tiles with single pixels in interleave 0 may be merged into a single tile with pixel 0 and pixel 1 enabled (horizontal merge). Or two back-to-back tiles, each with pixel 0 and pixel 1 enabled, may be merged into a single tile with all four pixels enabled (vertical merge). In some embodiments, pixels may be merged only in non-supersampled mode.

Area Pattern Pipeline

The area pattern pipeline generates the source select control signals which are used in selecting the alpha and color channel sources. Also, the area pattern pipeline generates (or modifies) the pixel tag values (i.e., pixtag0[31:0], pixtag1[31:0], pixtag2[31:0] and pixtag3[31:0]) for the Z and AOWS pipelines. Additionally, the area pattern pipeline generates the pixel write inhibit signals (i.e., wrinh0, wrinh1, wrinh2 and wrinh3) that are output to the control pipeline. The area pattern pipeline may contain eight 4×32-bit register files and eight 2×32-bit register files. These register files make up a 32-row by 32-column by 1-bit deep area pattern scan memory array. The memory array addressing is screen aligned: Y mod 32 is the row address to the memory array; X mod 32 is the column address to the memory array. Thus, the area pattern repeats every 32 pixels in X and Y. Depending on other control bits in the FPC register, the area pattern bits can determine the source of pixel data for the corresponding pixel and, in some cases, whether or not the pixel is to be written to the frame buffer. A first stage of the area pattern pipeline is illustrated in FIG. 10A.

In standard mode, the eight 4×32 register files are used to read out a 16×8 block of data (i.e., 8 scanlines of 16-bits each) from the area pattern array. In supersample mode, the eight 4×32 register files and the eight 2×32 register files are used to read out an 8×16 block (i.e., 16 scanlines of 8-bits each).

The first stage of the area pattern pipeline includes the read address, write address, write data, and write enable registers within the register files themselves. For the 4×32 register files, the Y scanlines (i.e., horizontal rows) of the area pattern are stored as follows:

apd0 stores the area pattern bits for Y scanlines 0,8,16,24;

apd1 stores the area pattern bits for Y scanlines 1,9,17,25;

apd2 stores the area pattern bits for Y scanlines 2,10,18, 26;

apd3 stores the area pattern bits for Y scanlines 3,11,19, 27;

apd4 stores the area pattern bits for Y scanlines 4,12,20, 28;

apd5 stores the area pattern bits for Y scanlines 5,13,21, 29;

apd6 stores the area pattern bits for Y scanlines 6,14,22, 30;

apd7 stores the area pattern bits for Y scanlines 7,15,23, 31.

Scanlines 8–15 and 24–31 of the area pattern may be redundantly stored in the 2×32 register files as follows:

apd8 stores the area pattern bits for Y scanlines 8 & 24;

apd9 stores the area pattern bits for Y scanlines 9 & 25;

apd10 stores the area pattern bits for Y scanlines 10 & 26;

apd11 stores the area pattern bits for Y scanlines 11 & 27;

apd12 stores the area pattern bits for Y scanlines 12 & 28;

apd13 stores the area pattern bits for Y scanlines 13 & 29;

apd14 stores the area pattern bits for Y scanlines 14 & 30;

apd15 stores the area pattern bits for Y scanlines 15 & 31.

In the first stage of the area pattern pipeline, 16 adjacent scanlines from the 32×32 area pattern are accessed starting at the scanline defined by the te_fp_y[4:0] Y address bits received from the control pipeline. The 32-row by 32-column screen space region of interest is thus narrowed to a 16-row by 32-column region of interest as suggested by FIG. 11.

The register file outputs are then registered before sending the data to the second stage. The output of the eight 4×32 register files are also muxed onto the 32-bit bus, apc_apd[31:0], which serves as a register readback path.

As an example, if te_fp_y[4:0]=00011 (i.e., 3 decimal) the first stage outputs scanlines 3–18 inclusive as follows:

apd0 provides scanline 16;

apd1 provides scanline 17;

apd2 provides scanline 18;

apd3 provides scanline 3;

apd4 provides scanline 4;

apd5 provides scanline 5;

apd6 provides scanline 6;

apd7 provides scanline 7;

apd8 provides scanline 8;

apd9 provides scanline 9;

apd10 provides scanline 10;

apd11 provides scanline 11;
apd12 provides scanline 12;
apd13 provides scanline 13;
apd14 provides scanline 14;
apd15 provides scanline 15.

As another example, if te_fp_y[4:0]=01001 (i.e., 9 decimal) the first stage outputs scanlines 9–24 as follows:

apd0 provides scanline 16;
apd1 provides scanline 17;
apd2 provides scanline 18;
apd3 provides scanline 19;
apd4 provides scanline 20;
apd5 provides scanline 21;
apd6 provides scanline 22;
apd7 provides scanline 23.
apd8 provides scanline 24;
apd9 provides scanline 9;
apd10 provides scanline 10;
apd11 provides scanline 11;
apd12 provides scanline 12;
apd13 provides scanline 13;
apd14 provides scanline 14;
apd15 provides scanline 15.

As yet another example, if te_fp_y[4:0]=11110, i.e., 30 decimal, the first stage outputs scanlines 30, 31 and 0–13 as follows:

apd0 provides scanline 0;
apd1 provides scanline 1;
apd2 provides scanline 2;
apd3 provides scanline 3;
apd4 provides scanline 4;
apd5 provides scanline 5;
apd6 provides scanline 6;
apd7 provides scanline 7.
apd8 provides scanline 8;
apd9 provides scanline 9;
apd10 provides scanline 10;
apd11 provides scanline 11;
apd12 provides scanline 12;
apd13 provides scanline 13;
apd14 provides scanline 30;
apd15 provides scanline 31.

Note the circular topology of the area pattern. The first stage accesses the 16 consecutive scanlines defined by (te_fp_y[4:0]+k) mod 32, where k ranges from 0 to 15 inclusive.

Figure 11:
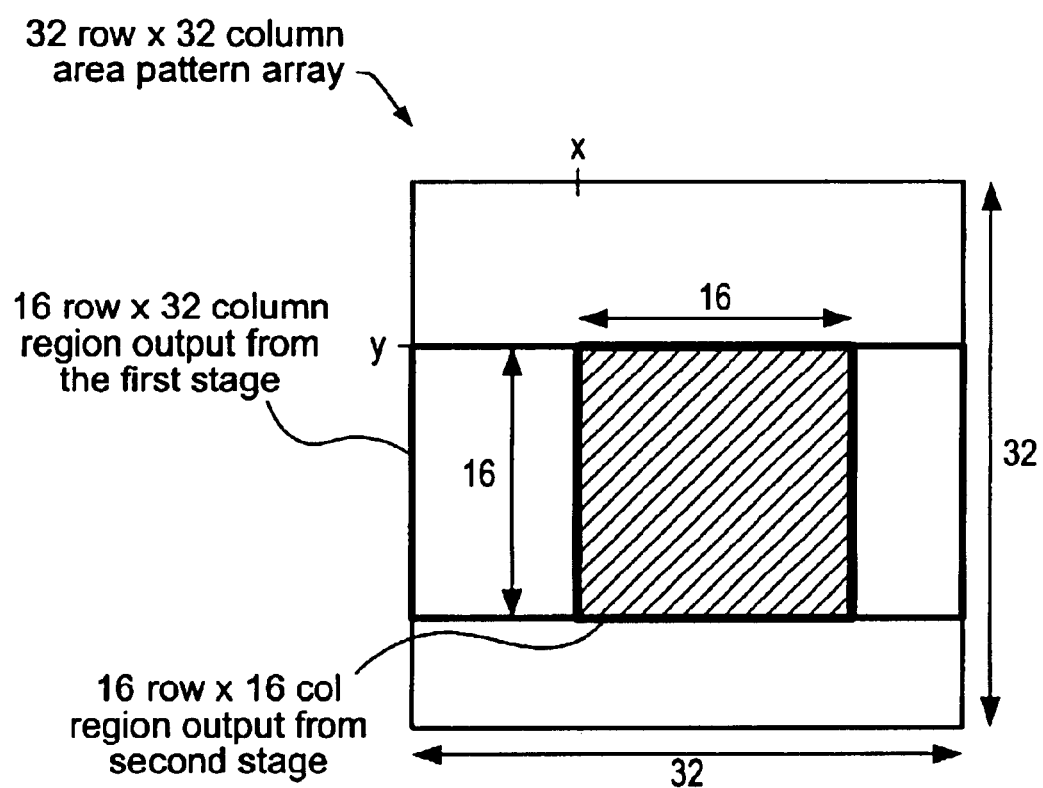
FIG. 11 illustrates the selection of a 16 row×16 column region within a 16 row×32 column region provided by the first stage in one embodiment.

In the second stage (illustrated in FIG. 10B) the 16 row×32 column region may be narrowed down to a 16 row×16 column region as suggested by FIG. 11 using the ca_p1_x[4:0] address bits, and the cap_p1_std_ssp mode bit (which distinguishes been standard mode and supersample mode). The 16 scanlines generated by the first stage are supplied to 16 corresponding mux logic units. The first eight mux logic units receive the scanlines p1_apd0 through p1_apd7 generated by the 4×32 register files. The last eight mux logic units receive the scanlines p_apd8 through p_apd15 generated by the 2×32 register files.

Each mux logic unit selects and outputs 16 consecutive bits starting at the address ca_p1_x[4:0] from its 32 bit input scanline. In particular, each mux logic unit may select the sixteen bits defined by (ca_p1_x[4:0]+j) mod 32, where j ranges from 0 through 15 inclusive.

The next two levels of muxes in the second stage use the ca_p1_y[2] address bit along with the a stereo mode indicator bit (i.e., cap_stereo) to select the proper eight rows in the y-direction.

Figure 12:
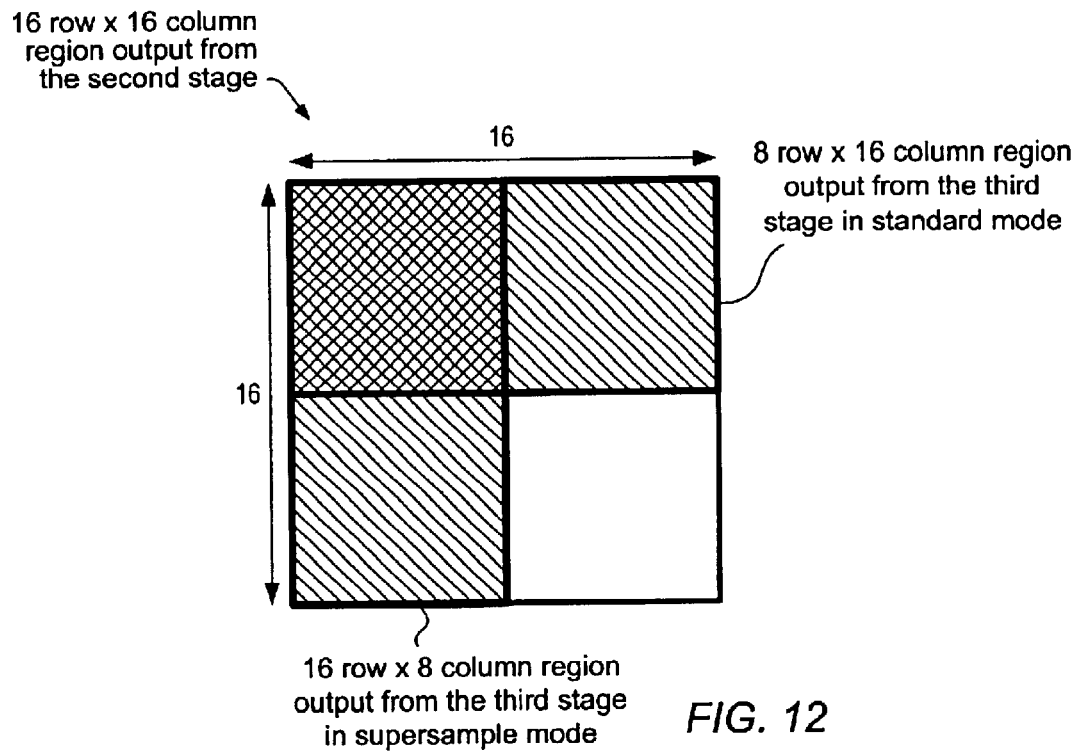
FIG. 12 illustrates the narrowing of a 16 row×16 column region to either an 8 row×16 column region in standard mode, or, to a 16 row×8 column region in supersample mode.

The third stage of the area pattern pipeline (see FIG. 10C) includes combinatorial logic that narrows the 16 row×16 column region provided by the second stage to an 8 row×16 column region in standard mode, or, to a 16 row×8 column region in supersample mode as suggested by FIG. 12. The input line p2_std_ssp may determine which mode is in effect.

The third stage receives 16 rows of which the first eight are denoted p2_ap0L3 through p2_ap7L3 and the last eight are denoted p2_apd8L1 through p2_apd15L1. The L3 in the first eight row names indicates that they derive from layer 3 of the second stage. Similarly, the L1 in the last eight row names indicates that they derive from the first layer of the second stage.

In standard mode, the 128 pattern bits from the first eight rows, i.e., p2_ap0L3 through p2_ap7L3, may be used to mask the 128 pixel tag bits contained in the inputs:

zap_p2_z0[25:0], cap_p2_aows0[5:0],
zap_p2_z1[25:0], cap_p2_aows1[5:0],
zap_p2_z2[25:0], cap_p2 aows2[5:0],
zap-p2-z3[25:0], cap_p2 aows3[5:0].

The 128 bits resulting from the masking operation may be loaded into the pixel tag outputs:

apz_pixtag0[31:0], apz_pixtag1[31:0], apz_pixtag2 [31:0] and apz_pixtag3[31:0].

In supersample mode, the 128 pattern bits from the first eight columns of each of the 16 rows, i.e., rows p2_ap0L3 through p2_ap7L3 and rows p2_apd8L1 through p2_apd15L1, may be used to mask the 128 pixel tag bits contained in the inputs:

zap_p2_z0[25:0], cap_p2_aows0[5:0],
zap_p2_z1[25:0], cap_p2_aows1[5:0],
zap_p2_z2[25:0], cap_p2 aows2[5:0],
zap-p2-z3[25:0], cap_p2 aows3[5:0].

Again, the 128 bits resulting from the masking operation may be loaded into the pixel tag outputs.

During a fast fill operation or fastfill partial operation, the third stage may generate the pixel tag output as indicated above based on the mode indicator p2_std_ssd.

During a "write fragment tile" operation (wr_frag_tile), the third stage may generate:

four write inhibit signals apc_pixwrinh0, apc_pixwrinh1, apc_pixwrinh2, apc_pixwrinh3;

four red color source select signals colsrc_sel0_r, colsrc_sel1_r, colsrc_sel2_r, colsrc_sel3_r;

four green color source select signals colsrc_sel0_g, colsrc_sel1_g, colsrc_sel2_g, colsrc_sel3_g;

four blue color source select signals colsrc_sel0_b, colsrc_sel1_b, colsrc_sel2_b, colsrc_sel3_b; and four alpha source select signals xsrc_sel0[1:0], xsrc_sel1[1:0] and xsrc_sel2[1:0], xsrc_sel3[1:0].

Figure 13:
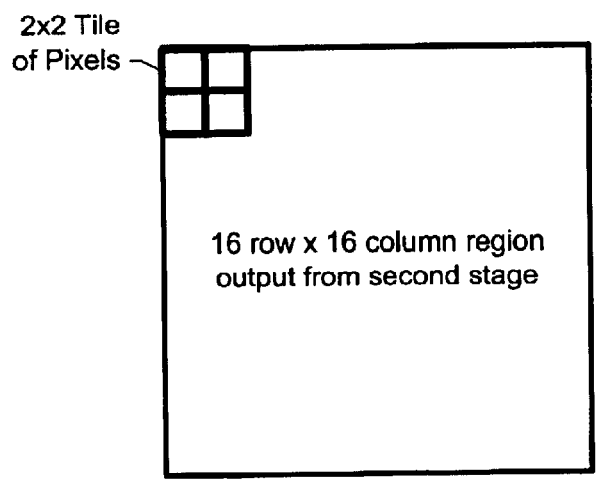
FIG. 13 illustrates the selection of a tile of pixels from a 16 row×16 column region provided by the second stage in one embodiment.

The 0, 1, 2 and 3 in the names of each set of signals indicates a correspondence to the four pixels within a 2×2 tile of pixels located at the top left of the 16 row×16 column region supplied by the second stage as suggested by FIG. 13. Within the tile, pixel 0 is the pixel at pattern address (x[4:0]mod 32, y[4:0]mod 32), pixel 1 is the pixel at pattern address ((1+x[4:0]) mod 32, y[4:0]mod 32), pixel 2 is the pixel at pattern address (x[4:0]mod 32, (1+y[4:0]) mod 32), pixel 3 is the pixel at pattern address ((1+x[4:0]) mod 32, (1+y[4:0]) mod 32), where x[4:0]=ca_p1_x[4:0], and y[4:0]=te_fp_y[4:0].

FIG. 14 is a table defining the color source selection function according to one embodiment. In this table, the cs (color source select), ap (area pattern enable) and tb (transparent background enable) control signals from the FPC register in the control pipeline combine with the area pattern bit to determine the RGB pixel data source.

FIG. 15 is a table defining the alpha (x) pixel source selection function. In this table, xs (x source select), ap (area pattern enable) and tb (transparent background) control signals combine with the area pattern bit to determine the x pixel data source.

The third stage of the area pattern pipeline receives three color source select signals (cap_cs_r, cap_cs_g, cap_cs_b), an area pattern enable (cap_ap), a transparent background enable (cap_tb), an x source select (cap_xs) from the FPC register of the control pipeline. The third stage may perform the operations indicated by FIGS. 14 and 15 to generate the color source select and x source select output signals.

Among other inputs, the third stage receives:
aap_p2_bin0[1:0], aap_p2_bin1[1:0], aap_p2_bin2 [1:0], aap_p2_bin3[1:0].

The purpose of these input signals is to determine what the area pattern bit is for each bin in a 2×2 tile.

Note: Many of the signals described herein follow the convention of having a one (or two) letter prefix for the source submodule, followed by a one (or two) letter prefix for the destination submodule, followed by the signal name. These prefix letters are summarized in following table.

Table of Submodule Prefix Letters

| Submodule Name | Submodule Prefix Letters |
| --- | --- |
| Z-Pipeline | z |
| Depth-Cue Pipeline | d |
| Address Pipeline | a |
| Area Pattern Pipeline | ap |
| Alpha Pipeline | x |
| Color Pipeline | cl |
| Merge Unit | m |
| Control Pipeline | c |

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A circuit comprising:
a first stage configured to output N adjacent scan lines from a 2N×2N area pattern array based on a first address input, wherein N is a positive integer;
a second stage configured to receive the N adjacent scanlines and to select an N×N block from the N adjacent scanlines based on a second address input;
a third stage configured to (a) select an (N/2)×N region of bits from the N×N block and load bits of the (N/2)×N region into a set of pixel tag outputs in a first mode, and (b) select an N×(N/2) region of bits from the N×N block and load bits of the N×(N/2) region into the set of pixel tag outputs in a second mode.

2. The circuit of claim 1, wherein N is a power of two.

3. The circuit of claim 1, wherein N equals 16.

4. The circuit of claim 1, wherein the N adjacent scan lines are consecutive scan lines in the circular topology of the area pattern array.

5. The circuit of claim 1, wherein the second mode is a supersample mode.

6. The circuit of claim 1, wherein the first stage comprises:
a first rank of M register files;
a second rank of M register files;
wherein each register file of the first rank stores 2N/M scan lines of the area pattern array, wherein M is a positive integer;
wherein each register file of the second rank stores N/M scan lines of the area pattern array;
wherein the first rank is configured to output a first set of (N/2) of the N adjacent scanlines;
wherein the second rank is configured to output a second set of (N/2) of the N adjacent scanlines.

7. The circuit of claim 1, wherein the first stage includes a read address generation unit configured to receive the first address input and to generate read addresses for each of the register files in the first rank and second rank.

8. The circuit of claim 1, wherein the registers files of the first rank are 4×32 register files.

9. The circuit of claim 1, wherein the register files are programmable by a host processor.

10. The circuit of claim 1, wherein the second stage includes an array of N mux logic units, wherein each mux logic unit is configured to receive a corresponding one of the N adjacent scanlines and to select a set of N consecutive bits defined by the second address input from the corresponding scanline.

11. The circuit of claim 10, wherein the second stage includes a first level of muxes and a second level of muxes coupled to the outputs of the first level of muxes, wherein the first level of muxes is controlled by y address information, wherein the second level of muxes is controlled by a stereo indicator bit.

12. The circuit of claim 10, wherein the third stage is further configured to select a $K_1 \times K_2$ rectangle of bits from the N×N block in response to an opcode input indicating a pixel write fragment mode.

13. The circuit of claim 12, wherein the third stage is configured to generate a set of $K_1 * K_2$ inhibit signal outputs based on the values of the $K_1 \times K_2$ rectangle of bits, wherein the inhibit signal outputs conditionally inhibit pixel write operations for corresponding pixels.

14. The circuit of claim 12, wherein $K_1$ and $K_2$ equal two.

15. The circuit of claim 12, wherein the third stage is configured to generate a set of source select signal outputs based on values of the $K_1 \times K_2$ rectangle of bits and control input signals.

16. A method comprising:
(a) outputting N adjacent scan lines of a 2N×2N area pattern array based on a first address input, wherein N is a positive integer;
(b) selecting an N×N block from the N adjacent scanlines based on a second address input; and
(c) selecting an (N/2)×N region of bits from the N×N block and load bits of the (N/2)×N region into a set of pixel tag outputs in a first mode, and selecting an N×(N/2) region of bits from the N×N block and load bits of the N×(N/2) region into the set of pixel tag outputs in a second mode.

17. The method of claim 16, wherein (a), (b) and (c) are performed in a pipelined fashion.

18. The method of claim 16, wherein N is a power of two.

19. A system comprising:
a first means for outputting N adjacent scan lines from a 2N×2N area pattern array based on a first address input, wherein N is a positive integer;
a second means for selecting an N×N block from the N adjacent scanlines based on a second address input;
a third means for (a) selecting an (N/2)×N region of bits from the N×N block and load bits of the (N/2)×N region into a set of pixel tag outputs in a first mode, and (b) selecting an N×(N/2) region of bits from the N×N block and load bits of the N×(N/2) region into the set of pixel tag outputs in a second mode.

20. The system of claim 19, wherein the first means, second means and third means are organized in a pipelined fashion.

21. A graphics system comprising:
a frame buffer;
a hardware accelerator operable to receive graphics data, to render samples in response to the graphics data, to store the samples in the frame buffer, to read and filter the samples from the frame buffer to generate pixels, and to store the pixels in the frame buffer, wherein the hardware accelerator includes the circuit as recited in claim 1, wherein the circuit accesses area pattern bits that control a pixel operation on said pixels.

22. The graphics system of claim 21, wherein the pixel operation is a pixel write operation.

23. The graphics system of claim 21, wherein the pixel operation is a color source selection operation.

24. The graphics system of claim 21, wherein the pixel operation is an alpha source select operation.

25. A circuit comprising:
a first stage configured to output a first subset of N bits from an area pattern array based on a first address input, wherein N is an integer greater than or equal to eight;
a second stage configured to receive the first subset and to select a second subset of bits from the first subset based on a second address input;
a third stage configured to (a) select a fourth subset of bits from the second subset during a first mode, and (b) select a fifth subset of the bits from the second subset during a second mode.

26. The circuit of claim 25, wherein the third stage is configured to output a sixth subset of bits from the second subset during a third mode.

* * * * *